No. 628,831. Patented July 11, 1899.
J. B. MORGAN.
ANIMAL TRAP.
(Application filed May 5, 1899.)
(No Model.)
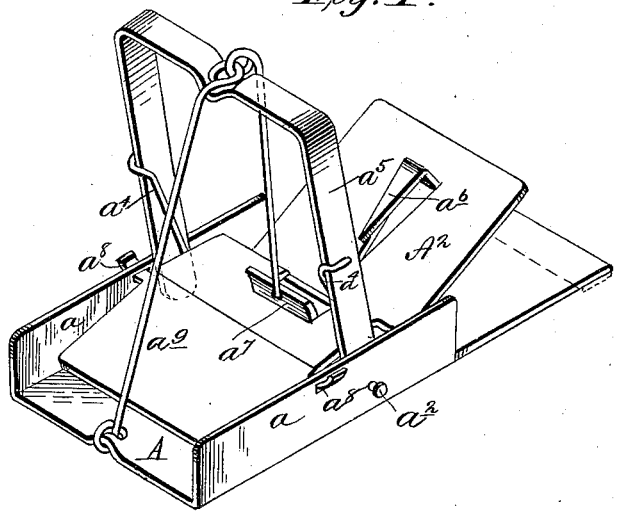
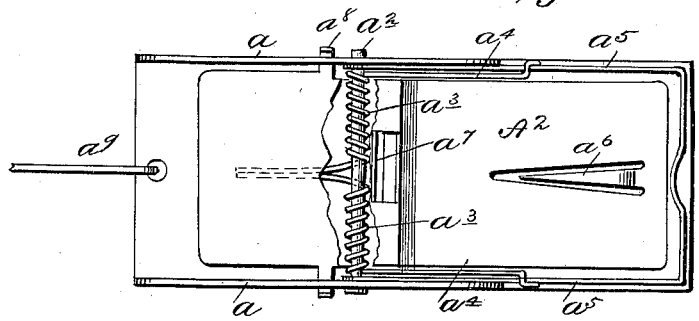
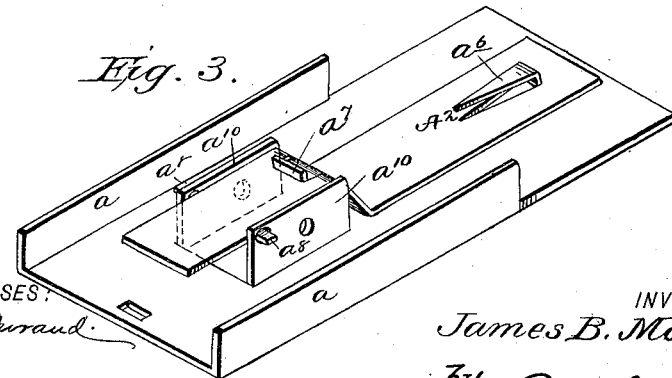
WITNESSES: Franck L. Ourand. R. M. Elliott.
INVENTOR: James B. Morgan.
by R. S. D. Newfirth, his attorney.

UNITED STATES PATENT OFFICE.

JAMES B. MORGAN, OF DAVENPORT, IOWA.

ANIMAL-TRAP.

SPECIFICATION forming part of Letters Patent No. 628,831, dated July 11, 1899.

Application filed May 5, 1899. Serial No. 715,731. (No model.)

*To all whom it may concern:*

Be it known that I, JAMES B. MORGAN, a citizen of the United States, residing at Davenport, in the county of Scott and State of Iowa, have invented certain new and useful Improvements in Animal-Traps; and I do hereby declare the following to be a full, clear, and exact description of the invention, such as will enable others skilled in the art to which it appertains to make and use the same.

The object is to present a simple, efficient, and durable trap in which the parts will not become deranged in use and which will not only firmly hold any animal caught, but will also kill the same in a humane and painless manner.

The invention consists in the novel construction and combination of parts of an animal-trap, as will be hereinafter fully described and claimed.

In the accompanying drawings, forming a part of this specification and in which like letters of reference indicate corresponding parts, Figure 1 is a view in perspective of one form of trap embodying the invention, showing the same in "set" position. Fig. 2 is a view in plan with portions broken away to show certain parts obscured in Fig. 1. Fig. 3 is a perspective view of a modified form of trap.

Referring to the drawings and to Figs. 1 and 2 thereof, A designates the base or floor of the trap, the same being made of any suitable material, preferably of metal, and provided with side flanges $a$, extending about two-thirds (more or less) of the length of the base. These flanges may be integral with the base or may be made separate therefrom and secured thereto in any desired manner. From a standpoint of economy the base will be made of thin sheet metal, and in order to give it the requisite rigidity at the front end it may be reinforced in any suitable manner, as by turning under the metal at this end, as indicated by dotted lines in Fig. 1, or by turning down a slight flange transversely of the base, or by corrugating the bottom, either as may be preferred.

Passing through openings in the flanges $a$ is a pin $a^2$, upon which is wound two spiral springs $a^3$, one extremity of each of which bears upon the base and the other extremity upon a bail $a^5$, also mounted on the pin $a^2$. As shown, the extremities $a^4$ are formed into hooks to engage with the upper edges of the bail; but it is to be understood that the invention is not to be limited to this particular manner of coaction between the springs and the bail, as the latter may be provided with openings through which the extremities of the springs may pass, or, if preferred, the bail itself may be made of a piece of spring-wire bent to form the springs and the bail.

The bait-plate $A^2$, which also constitutes the trigger, is constructed, by preference, of a piece of metal and is provided near one end with a bait-hook $a^6$, formed in this instance by stamping out a tongue of metal of the required shape, although, if preferred, this hook may be secured to the plate. At a point intermediate of the ends of the plate there is provided a tumbler or catch $a^7$, which may, as shown, be formed by stamping the same up from the plate, or it may be secured thereto in any manner, and adjacent to this catch and projecting outward from each side of the plate are two pintles $a^8$, which engage openings provided in the plate for the purpose, whereby the plate is allowed to swing through a limited arc to bring the catch into engagement with the sear. These pintles may be integral with the plate $A^2$ or be secured thereto.

At the end of the base opposite to that occupied by the bail when sprung is arranged the sear $a^9$, in this instance constructed of two members linked together, one of the members being linked into engagement with an opening provided in the base for the purpose and the other member being provided with a toe for engaging the tumbler $a^7$ when the trap is set.

In setting this trap a bait is first placed on the hook $a^6$. The bail is then raised against the stress of the springs $a^3$ to the position shown in Fig. 1, and the sear is then passed over the bail and its toe brought into engagement with the tumbler. The hook $a^6$ is located at such distance from the end of the plate $A^2$ as to bring an animal's neck in line with the outer end of the bail when sprung, so that the animal's neck will in most cases be broken, thereby preventing pain or torture.

In Fig. 3 there is shown a slightly-modified form of trap from that shown in Fig. 1. The first form illustrated is adapted for catching mice and other small animals. The second form illustrated is adapted for catching rats, squirrels, &c. In all essential respects the second embodiment is like the first, the main difference residing in the manner of arranging the springs $a^3$ and the plate $A^2$. In addition to the flanges $a$ as employed in connection with the embodiment shown in Fig. 1 two other flanges $a^{10}$ are provided, which may be struck up from the metal of the base A or be secured thereto, as may be preferred. These flanges $a^{10}$, as well as the flanges $a$, are provided with alined openings, through which passes the pin $a^2$, and between the inner and outer flanges on each side of the base the springs $a^3$ are arranged. The bail $a^5$ is to be arranged as shown in Fig. 1 and to be actuated by the springs $a^3$ in the manner set forth. The bait-plate $A^2$ is hung between the flanges $a^{10}$. These flanges perform a triple function. They serve as the supports for the bait-plate, to brace and stiffen the pin $a^2$, and to keep the springs $a^3$ in proper position for use. The operation of this form of trap is the same as that shown in Fig. 1 and therefore needs no further description.

Having thus fully described my invention, what I claim as new, and desire to secure by Letters Patent, is—

An animal-trap comprising a base provided with flanges, a pin passing through the flanges, a bail on the pin, springs also carried by the pin and having hooked-shaped projections to engage the upper edge of the bail, a pivoted bait-plate or trigger carrying a bait-hook and a tumbler or catch, and a sear comprising two members linked together, one of the members being connected with the base, and the other having a toe to engage with the tumbler, substantially as described.

In testimony whereof I affix my signature in the presence of two witnesses.

JAMES B. MORGAN.

Witnesses:
　JOHN BENEDICT,
　W. R. MAINES.